June 9, 1925.
W. G. HOLMES
MINE CAGE
Filed Jan. 21, 1924
1,541,144
2 Sheets-Sheet 1
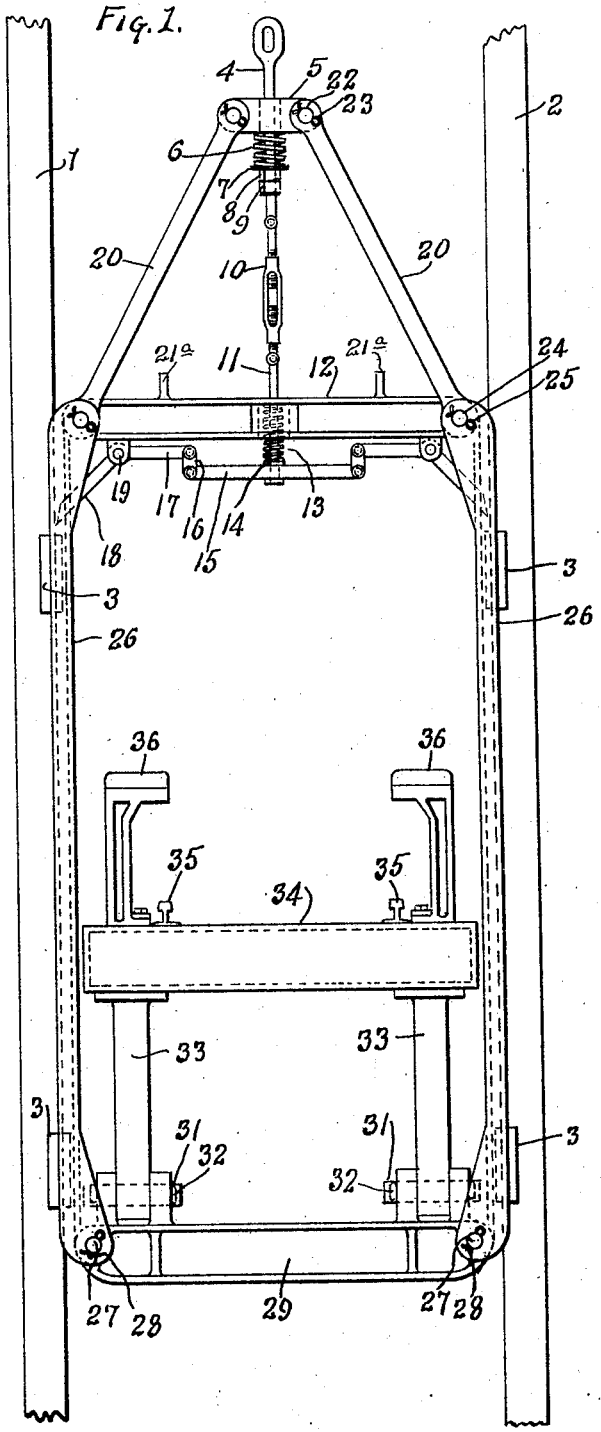
INVENTOR.
WILLIAM G. HOLMES,
BY
ATTORNEYS.

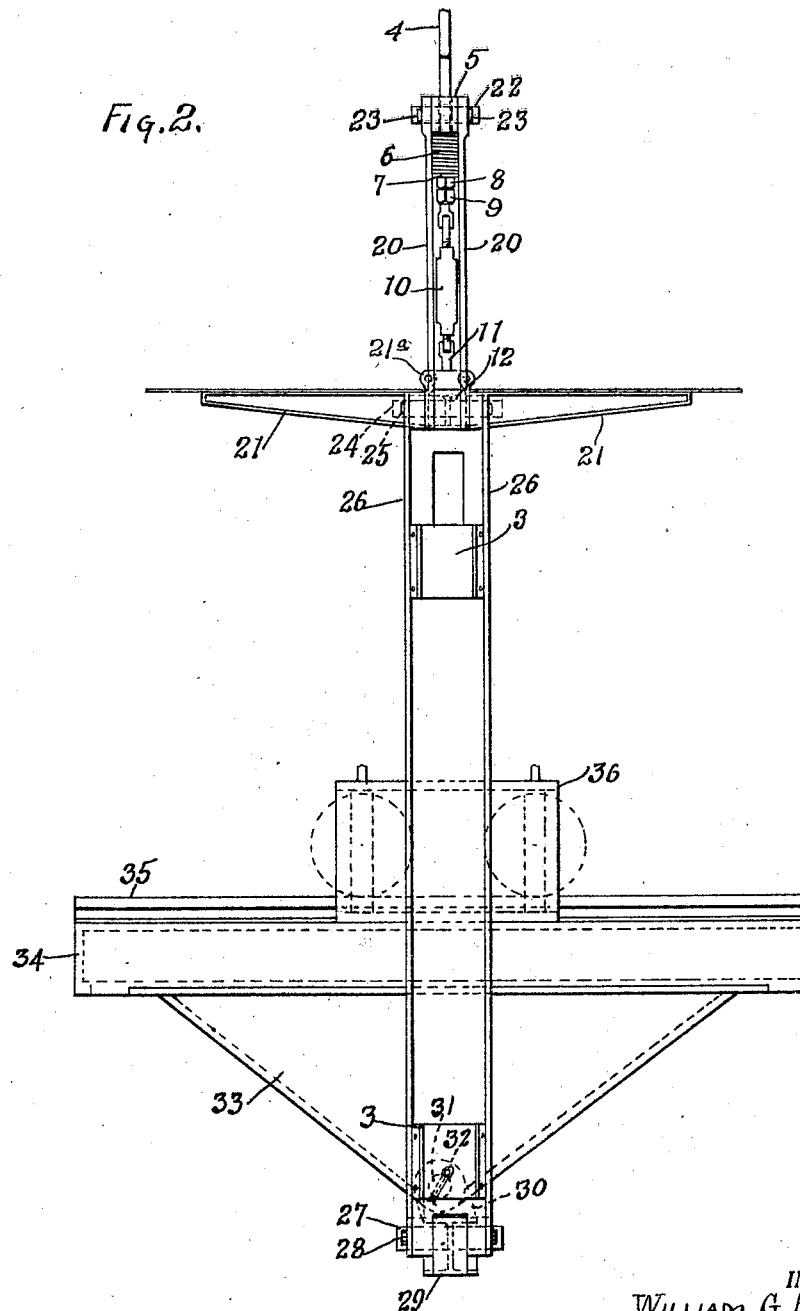

Patented June 9, 1925.

1,541,144

UNITED STATES PATENT OFFICE.

WILLIAM G. HOLMES, OF DANVILLE, ILLINOIS.

MINE CAGE.

Application filed January 21, 1924. Serial No. 687,455.

*To all whom it may concern:*

Be it known that I, WILLIAM G. HOLMES, a citizen of the United States, residing at Danville, in the county of Vermilion and State of Illinois, have invented certain new and useful Improvements in Mine Cages, of which the following is a specification, reference being had therein to the accompanying drawing.

My invention relates to mine cages.

It is the object of my invention to provide a mine cage of great strength to withstand the strain and vibrations imposed upon it, due to stopping, starting and landing, and it is a further object to do away with rivets and bolts which become loose in the mine cage frame and platform as now employed in the art. The life of mine cages at the present time is very short, because the shock of landing upon the set of timbers at the bottom of the shaft in a mine loosens the rivets and bolts and breaks the parts. If the present design of cage is strengthened to withstand such treatment, it then becomes too heavy and unwieldy for the purposes desired.

It is the object of my invention to provide an articulative cage and an articulative bail which will permit of a very strong cage of simple design, which will accommodate itself to the irregularities of the shaft and of the landing. My improved cage, because of its flexible construction and because of the flexible bail, will withstand the shocks, while it is still constructed and made of parts of the minimum lightness.

It is a further object of my invention to have a construction which may be easily repaired with simple tools without the necessity of special tools or special skill.

Referring to the drawings:

Figure 1 is an end elevation of my cage and bail as installed to travel on the guides in the shaft.

Figure 2 is a side elevation.

Referring to the drawings in detail:

1 and 2 are the guides or slides on which the shoes 3 of the cage travel, for guiding the cage in its movement up and down in the shaft.

The cage is suspended from the cable by an eye bolt 4 which passes through a cross link 5. Supporting the link on the bolt 4 is a stiff helical spring 6 which rests upon a plate or washer 7, supported by the nuts 8 and 9 threaded on the bolt 4. This bolt is connected to a turn buckle 10, the other end of which is attached to a bolt 11, which passes through the top frame member 12 of the cage. This bolt 11 engages with the cage through the cross member 12 by a helical spring 13 which surrounds the bolt 11. The lower end of this bolt carries a washer 14, upon which the spring 13 rests. A cross link 15 is carried on the end of the bolt 11. This link is provided on either end with the vertical links 16 which are in turn connected to the bell crank 17, which has an outer braking surface 18 for engagement with the guides 1 or 2 to hold the cage suspended in any desired position when the cable is slack and the springs force the brake shoes against the guides. These bell crank members 17 are pivoted on eyes 19 carried on the under side of the top cage member 12. The outer ends of the member 12 and the outer ends of the cross link 5 are connected by the diagonal bail links 20, of which there are a pair on either side embracing the respective sides of the parts 12 and 5. To protect the men on the cage from falling objects doors 21 hinged at 21ª are provided. When pipe or other long objects are taken on the cage these doors 21 may be swung up out of the way. The upper end of the bail links are connected by the bolts 22 to the ends of the cross link 5, cotter pins 23 provide for a secure fastening of the bolts in position and a ready removal thereof when desired. Similar bolts 24 and cotter pins 25 are provided at the lower ends of the bail links. These bolts 24 and cotter pins 25 also serve to join on either side of the top frame member 12 the side frame members 26 of the cage. Between these members are located the shoes 3.

The lower ends of these side frame members are connected by the bolts 27 and the cotter pins 28 to a bottom frame member 29. It will be noted that the ends of the side frame members 26 are thickened near the points of connection with the top and bottom frame members. The bottom frame member 29 is provided on either side thereof with a pair of upstanding ears 30 which have eyes therein for receiving the bolts 31, which are held in position by the cotter pins 32. These eyes are provided in spaced pairs on either end of the bottom frame member 29. Between these spaced pairs and held in position by the bolt 31 passing therethrough are V-shaped supporting members 33, which serve to support the platform 34 on which are mounted the rails 35 and the guards 36. The mine car is rolled on the rails and is prevented from leaving the rails by the guards 36.

It will be observed that none of the parts of the cage and bail are rigidly connected together. All of the joints are flexible or articulated, permitting the cage to be made of a few very strong, simple, parts with no bolts or nuts to be loosened, or rivets to be repaired. The parts can be strengthened as the surplus weight from bolts and nuts can be eliminated and the corresponding weight put into a few simple parts. The cage itself being flexible, as well as the bail, can conform itself to the inequalities of the guides 1 and 2. It can readily be assembled or disassembled and easily repaired. The strong bottom frame member easily takes up the shock upon the broad bearing surface of the substantial pins 27. If the landing stage at the bottom of the shaft is not precisely level, the cage will accommodate itself without any disastrous warping which would otherwise be the case if the parts were rigidly secured to one another.

It will be observed that there is ample room in the parts 5 and 12 for the lateral movements of the bolts 4 and 11.

I desire to comprehend within my invention such modifications as may be necessary to adapt it to varying conditions.

Having thus fully described my invention, what I claim as new and desire to secure by Letters Patent, is:

1. A new article of manufacture comprising a mine cage having top, bottom, and side members flexibly connected.

2. A new article of manufacture comprising a mine cage having top, bottom, and side members flexibly connected, and suspended by a bail flexibly connected to the cage and to the supporting cable.

3. A new article of manufacture comprising a mine cage having top, bottom, and side members flexibly connected, and suspended by a bail flexibly connected to the cage and to the supporting cable, and guiding means carried by the side frame members of the cage.

4. In a mine cage, a top member, a bottom member, side members pivotally connected thereto.

5. In a mine cage, a top member, a bottom member, side members pivotally connected thereto, and guides carried by said side members.

6. In a mine cage, a top member, a bottom member, side members pivotally connected thereto, guides carried by said side members, and a bail consisting of a cross link and bail links connecting said cross link to said top frame and side members.

7. In a mine cage, a top member, a bottom member, side members pivotally connected thereto, guides carried by said side members, and a bail consisting of a cross link and bail links connecting said cross link to said top frame and side members, said bail links being pivotally connected to the cross link and the side frame and top frame members.

8. In a mine cage, a top frame, a bottom frame, and side frame members connecting said top and bottom frame members, bolts passing through said members at their ends for pivotally connecting them to permit them to move relative to one another about the bolts as pivots and guides carried by the side members.

9. In a mine cage, a top frame, a bottom frame, and side frame members connecting said top and bottom frame members, bolts passing through said members at their ends for pivotally connecting them to permit them to move relative to one another about the bolts as pivots, and guides carried by the side members, bail links pivotally mounted on the bolts connecting the side frame members and the top frame, a cross link suspended from a cable bolt, said bail links being pivotally connected to the ends of said cross link.

10. In a mine cage, a top frame, a bottom frame, and side frame members connecting said top and bottom frame members, bolts passing through said members at their ends for pivotally connecting them to permit them to move relative to one another about the bolts as pivots, guides carried by the side members, bail links pivotally mounted on the bolts connecting the side frame members and the top frame, a cross link suspended from a cable bolt, said bail links being pivotally connected to the ends of said cross link, a cable bolt adapted to move freely vertically and laterally in said cross link, braking mechanism suspended from said top frame member, yielding means for actuating said braking mechanism when the cable is slack, and means of connecting said braking mechanism to said cable bolt.

11. In a mine cage, a top frame, a bottom frame, and side frame members connecting said top and bottom frame members, bolts passing through said members at their ends for pivotally connecting them to permit them to move relative to one another about the bolts as pivots, guides carried by the side members, bail links pivotally mounted on the bolts connecting the side frame members and the top frame, a cross link suspended from a cable bolt, said bail links being pivotally connected to the ends of said cross link, a cable bolt adapted to move freely vertically and laterally in said cross link, braking mechanism suspended from said top frame member, yielding means for actuating said braking mechanism when the cable is slack, and means of connecting said braking mechanism to said cable bolt, a portion of said yielding means engaging with the top frame member and another portion engaging with the cross link.

12. In a mine cage, a top frame member, a bottom frame member, spaced side frame members carrying slides therebetween and embracing the sides of the ends of the top and bottom frame members, bolts connecting said parts to permit them to move with respect to one another and bail links embraced between the ends of the top frame member and the ends of the side members, said bail links being mounted on the bolts connecting the parts, a cross link connected with a cable, the ends of said cross link being embraced by the bail links on either end and either side thereof and bolts for pivotally mounting said bail links on the respective ends of said cross link.

13. In a mine cage, a top frame, a bottom frame, side frame members pivotally connected thereto, bail links pivotally connected to said cage and to a supporting cable, and a platform supported on the bottom frame member, said platform being adapted to support and maintain in position a mine car.

14. In a mine cage, a top frame, a bottom frame, side frame members pivotally connected thereto, bail links pivotally connected to said cage and to a supporting cable, a platform supported on the bottom frame member, said platform being adapted to support and maintain in position a mine car, and said platform being pivotally mounted upon the bottom frame member.

15. In a mine cage, a top frame, a bottom frame, side frame members pivotally connected thereto, bail links pivotally connected to said cage and to a supporting cable, a platform supported on the bottom frame member, said platform being adapted to support and maintain in position a mine car, said platform being pivotally mounted upon the bottom frame member, and braking means carried by the top frame member adapted to be actuated upon the slacking of the cable.

16. In a mine cage, a top frame, a bottom frame, side frame members pivotally connected thereto, bail links pivotally connected to said cage and to a supporting cable, and a platform supported on the bottom frame member, said platform being adapted to support and maintain in position a mine car, and doors hinged to said top frame.

In testimony whereof I affix my signature.

WILLIAM G. HOLMES.